US005526437A

United States Patent [19]
West

[11] Patent Number: 5,526,437
[45] Date of Patent: Jun. 11, 1996

[54] INTEGRATED FOOD SORTING AND ANALYSIS APPARATUS

[75] Inventor: James K. West, Walla Walla, Wash.

[73] Assignee: Key Technology, Inc., Walla Walla, Wash.

[21] Appl. No.: 213,442

[22] Filed: Mar. 15, 1994

[51] Int. Cl.[6] .............................. B07C 5/342; G06K 9/66

[52] U.S. Cl. ............................ 382/141; 382/160; 348/91; 209/577; 209/639; 209/939

[58] Field of Search ............................ 382/1, 8, 15, 141, 382/142–152, 155, 159, 160; 348/91, 92, 125, 127; 364/474.15, 474.16; 209/576, 580, 639, 577, 939; 356/237; 250/223 R

[56] References Cited

U.S. PATENT DOCUMENTS

| | | | |
|---|---|---|---|
| Re. 33,357 | 9/1990 | Randall | 358/106 |
| 3,899,415 | 8/1975 | Codding et al. | 209/111.6 |
| 4,239,118 | 12/1980 | Lockett | 209/581 |
| 4,352,430 | 10/1982 | Maier et al. | 348/91 |
| 4,485,912 | 12/1984 | Carmichael et al. | 198/382 |
| 4,520,702 | 6/1985 | Davis et al. | 83/71 |
| 4,607,252 | 8/1986 | Neri | 340/515 |
| 4,687,107 | 8/1987 | Brown et al. | 209/556 |
| 4,692,799 | 9/1987 | Saitoh et al. | 348/125 |
| 4,697,709 | 10/1987 | Codding | 209/549 |
| 4,764,969 | 8/1988 | Ohtombe et al. | 382/8 |
| 4,776,466 | 10/1988 | Yoshida | 209/565 |
| 4,793,196 | 12/1988 | Davis et al. | 74/61 |
| 4,794,647 | 12/1988 | Forgues et al. | 382/8 |
| 4,818,993 | 4/1989 | Stockel | 340/825 |
| 4,830,180 | 5/1989 | Ferguson et al. | 198/836 |
| 4,884,696 | 12/1989 | Peleg | 209/576 |
| 4,895,643 | 1/1990 | Hippenmeyer | 209/552 |
| 4,923,066 | 5/1990 | Ophir et al. | 209/538 |
| 4,940,536 | 7/1990 | Cowlin et al. | 209/592 |
| 5,051,825 | 9/1991 | Cochran et al. | 356/237 |
| 5,085,325 | 2/1992 | Jones et al. | 209/580 |
| 5,105,149 | 4/1992 | Tokura | 324/158 R |
| 5,318,173 | 6/1994 | Datari | 382/8 |
| 5,335,293 | 8/1994 | Vannelli et al. | 382/1 |

OTHER PUBLICATIONS

Key Technology Brochure, "Accuscan Quality Control Monitor," 1992.

*Primary Examiner*—Joseph Mancuso
*Assistant Examiner*—Larry J. Prikockis
*Attorney, Agent, or Firm*—Wells, St. John, Roberts, Gregory & Matkin

[57] ABSTRACT

An integrated bulk food sorting and analysis apparatus comprises a wide-belt product conveyor which receives and conveys a laterally-distributed stream of bulk food articles past a product diverter. An upstream camera is positioned to view the stream of food articles upstream of the product diverter. Automated sorting logic is responsive to the upstream camera to individually determine optical characteristics of each food article. The product diverter is responsive to the automated sorting logic to divert a portion of the food articles from the stream depending upon their individual optical characteristics. The apparatus also includes a downstream camera positioned to view the stream of food articles downstream of the product diverter. A data processor is responsive to both the upstream camera and the downstream camera to periodically examine samples of food articles and to calculate upstream and downstream quality statistics regarding the stream of food articles. The data processor is programmed to compare the calculated upstream and downstream quality statistics to derive diverted product quality statistics regarding the food articles diverted by the product diverter. The data processor also calculates settings for the automated sorting logic based upon the calculated quality statistics.

27 Claims, 1 Drawing Sheet

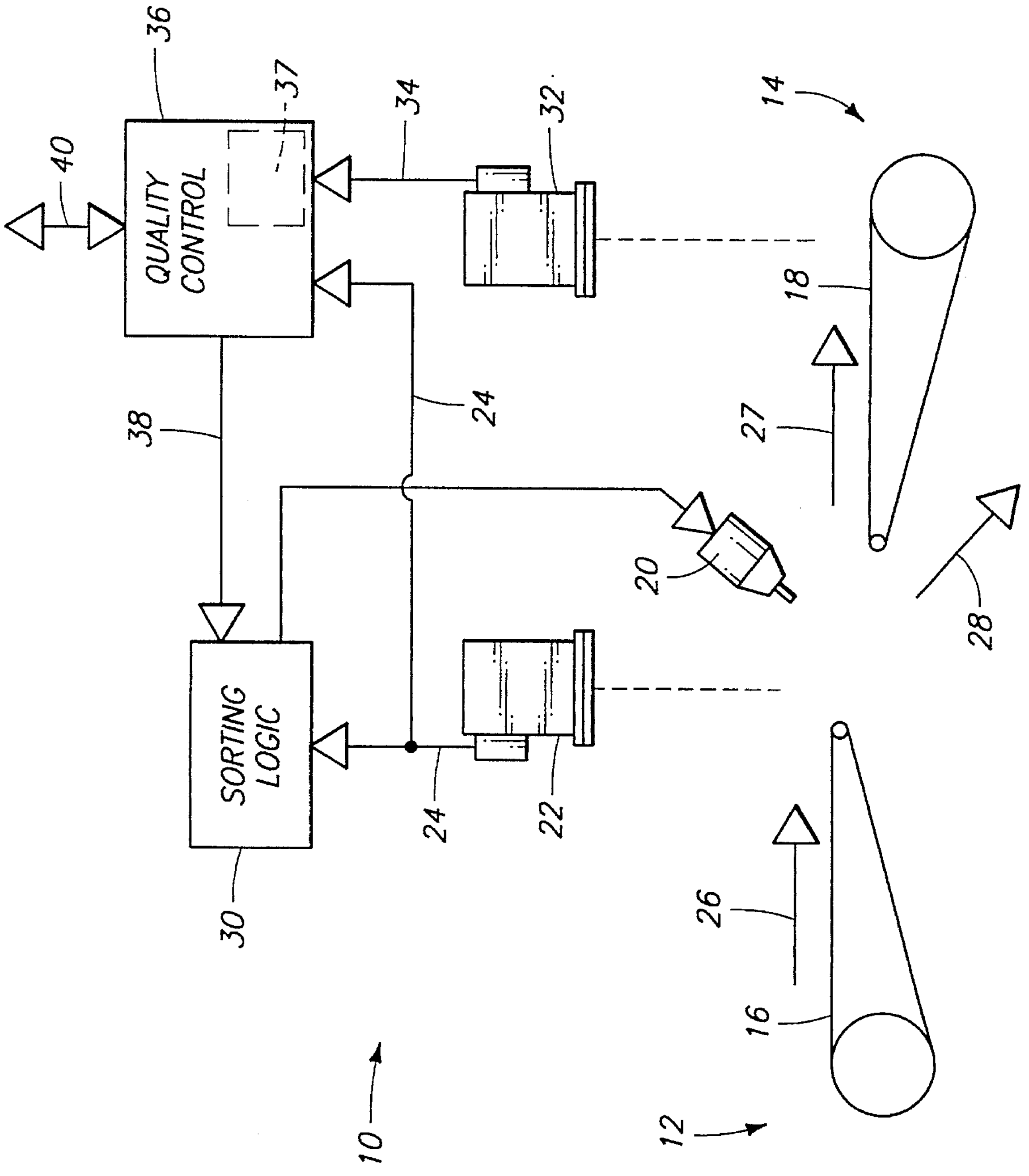
QUALITY CONTROL
SORTING LOGIC
10
12
14
16
18
20
22
24
24
26
27
28
30
32
34
36
37
38
40

INTEGRATED FOOD SORTING AND ANALYSIS APPARATUS

TECHNICAL FIELD

This invention relates to automated optical sorters and quality analysis apparatus for food processing lines.

BACKGROUND OF THE INVENTION

A variety of increasingly sophisticated devices are now being used in the food processing industry for automatically sorting food products. Many of these devices perform visual or optical inspection of food products to identify individual food articles having specified undesirable visual characteristics. Modern, high-speed, optical-based sorting devices are capable of efficiently removing or diverting such food articles from a high-speed flow of food articles.

U.S. Pat. No. Re. 33,357, assigned to Key Technology, Inc., of Walla Walla, Wash., describes one example of a food processing device which detects and removes defective products based upon their optical characteristics. Key Technology manufactures and sells a variety of such optical-based sorting systems, including systems utilizing color inspection cameras. Sorting systems such as these use wide belts to convey a random lateral distribution of individual food articles past an inspection station. The inspection station identifies undesirable or defective articles and removes them from the product flow.

One persistent limitation of prior art sorting devices such as these is that their correct operation is significantly dependent upon operator setup and monitoring. For example, an operator must somehow instruct a sorting device as to the nature of "defective" food articles. This involves, at a minimum, specifying a range of camera intensity variations corresponding to product colors or shades considered to be undesirable. With a color sorting system there are many ranges from which to choose, potentially making this aspect of system setup somewhat complex. To simplify the process, some systems, such as those manufactured by Key Technology, are able to "learn" acceptable shade variations by inspecting a product sample having no defects. Such systems then assume that other shade variations are undesirable. Often, it is also desirable to set size thresholds corresponding to different types of defects. This requires additional instructions from an operator.

Despite the above "learning" features, fine-tuning a sorter almost always involves manual adjustment of a plurality of interacting parameters. Setting up an optical sorting system for correct operation thus requires an experienced and capable operator. Even assuming such an operator is available, however, optimum results are not always obtained. One reason for this is the many ambiguities present in setting a precise division between acceptable and defective products. These ambiguities often arise because of the variable nature of incoming product, because of data processing constraints, because of imperfections in obtaining the data upon which decisions are based, and because of the imprecise manner in which defective articles are separated from the product stream in many sorting devices. Because of these ambiguities, commercial automated sorters cannot be completely accurate in their identification of defective articles. Trade-offs and compromises are usually involved in determining optimum settings. For instance, sorter sensitivities can be increased to produce a corresponding increase in the number of defective products which are correctly identified and rejected. However, increasing sorter sensitivities often also increases the number of acceptable products which are erroneously identified as being defective. Most efficient operation is attained when an appropriate compromise is reached.

The problems noted above are not completely unique to automated sorters. In fact, many of the same problems are present when sorting is performed manually, by human inspectors. Because of the impossibility of obtaining a "perfect" sort, processing lines are intended to produce finished products within a range of targeted quality parameters or statistical objectives. Such parameters or objectives specify the nature of articles to be considered defective, and also specify a maximum permissible allowance of different types of defects within the overall finished product.

In automated systems, it is desirable to purposely exploit any available defective product allowances in order to minimize the number of acceptable products which are erroneously rejected as defective and to increase overall yield. Therefore, to achieve maximum efficiency an automated sorting device is set to a minimum sensitivity such that it will limit the presence of defective product within the finished product to just below the specified allowance. In other words, the optimal settings will reject no more product than is necessary to meet specified statistical objectives. This reduces the number of acceptable articles which are erroneously rejected, and increases the overall product yield.

Regardless of whether sorting is performed manually or by machine, periodic quality control inspections are required to ensure that the finished product meets specified quality objectives. In the past, these inspections have been conducted manually, by human quality control inspectors. Finished product quality inspection involves not only identifying defective and other types of products within a product sample, but also counting the relative number of such products. Numerous samples must typically be inspected to produce reliable quality statistics regarding the finished product.

Quality inspection and verification has more recently been performed by an automated quality analysis device, known as an AccuScan quality control monitor, available from Key Technology. This is a prior art device which utilizes a calibrated and stabilized color camera to produce statistical data regarding product quality. It allows an operator to specify defective product regions on a color image of an actual food article sample. The device then takes periodic "snapshots" of a food product stream and produces corresponding quality statistics, based upon the specifications made by the operator. These statistics are available on a generally continuous basis. Further information regarding the AccuScan quality control monitor is available from Key Technology and from U.S. Pat. No. 5,335,293 entitled Product Inspection Method and Apparatus, issued Aug. 2, 1994. This patent is incorporated herein by reference.

If quality statistics show that the finished product is out of tolerance, corrective measures must be taken. Such measures usually involve adjusting one or more sorter sensitivity settings or other sorting criteria settings. Skill and experience is required to predict which settings must be changed to improve results. One common mistake is to ignore the rejected products and to focus only on the finished product. This tends to result in the use of overly aggressive sorting criteria. While this ensures a high-quality finished product, it often reduces product yields by causing rejection of more product than necessary.

An optimal setup requires knowing not only the quality of the finished product, but also the quality of the rejected products. This is necessary to evaluate the number of acceptable products which have been erroneously rejected from the product stream. Proper setup of a sorting device requires keeping this number, which is not ascertainable from an inspection of the finished product alone, to a minimum. Accordingly, quality control procedures must involve both the accepted and the rejected products. In the past, this has required extensive human analysis or a pair of AccuScan quality control monitors.

On-going monitoring of sorting performance is also required. Sorter performance tends to vary with time, depending on the physical characteristics of the starting food products, on potentially drifting electrical or optical characteristics of the sorter, and on environmental or ambient conditions. Sorter settings must be updated periodically to maintain optimum performance. The operator skill and experience required at initial setup are thus required at many times during sorter operation. Providing optimal settings for automated sorting systems requires significant and on-going effort, despite the recent availability of automated quality monitoring monitors such as Key Technology's AccuScan.

BRIEF DESCRIPTION OF THE DRAWING

The drawing is a schematic representation of a food sorting and analysis system in accordance with a preferred embodiment of the invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts." U.S. Constitution, Article 1, Section 8.

A preferred embodiment of the invention, shown in the drawing, comprises an automated, optical-based food sorting and analysis apparatus or system, generally designated by the reference numeral 10. Automated sorter 10 includes a wide-belt product conveyor which receives a continuous stream of bulk food articles and which conveys the food articles from an upstream end 12 to a downstream end 14 of sorter 10.

The preferred embodiment is most appropriate for use in conjunction with food products comprising a continuous bulk stream of individual food articles. However, the invention will also find application in processing lines where a stream of bulk food products is discontinuous, such as where products are supplied in sequential discrete batches.

Sorter 10 is intended to sort a wide and laterally-distributed parallel stream of bulk food articles to produce a sorted stream of finished product meeting specified statistical quality objectives. The specified quality objectives relate primarily to optical or visual characteristics of the individual food products. Sorter 10 classifies individual food articles as being one of two or more product types. In the preferred embodiment, these product types are referred to as "acceptable" and "defective." However, in some cases the two or more product types may all be equally "acceptable" for certain purposes.

The statistical objectives are specified in terms of a plurality of sorting criteria. The sorting criteria specify the physical or optical parameters by which individual food articles are to be judged as being one or another of the various product types: as acceptable or defective. The statistical objectives also define the permissible or desired ranges of different types of articles within the finished product, such as the permissible number of defective articles within the finished product. The statistical objectives typically provide for a certain allowance of individual defective articles within the finished product. One object of the invention described herein is to allow sorter 10 to purposely exploit such an allowance in order to minimize the quantity of rejected products.

To provide this capability, sorter 10 includes an integrated quality control monitor, independent of the actual sorting logic of sorter 10, which continuously monitors achieved quality statistics and which provides internal feedback regarding sorting results. The quality control monitor examines the product flow both before and after sorting has occurred to determine whether the statistical quality objectives have been achieved. The quality control monitor also determines whether defective product allowances are being exploited or whether too many acceptable products are being erroneously rejected. Sorter sensitivity settings are automatically updated as necessary to correct any detected sorting deficiencies and to optimize the sorter's performance for maximum yield without violating the statistical quality objectives.

In the preferred embodiment, the product conveyor comprises an upstream endless conveyor belt 16 and a downstream endless conveyor belt 18. These belts are typically wide enough to support and convey a wide lateral distribution of individual bulk food articles. Sorter 10 also includes a product diverter 20 positioned between the two conveyor belts. Product diverter is associated with automated sorting logic 30 which individually determines optical characteristics of each unsorted food article. Product diverter 20 is responsive to sorting logic 30 to divert individual food articles from the parallel stream, depending upon their individual visual characteristics, before they reach the downstream conveyor belt. In the discussion below, that portion of the overall product stream which is upstream of the product diverter is referred to as an "unsorted" product stream. That portion of the overall product stream which is not diverted by the product diverter, and which proceeds to downstream conveyor belt 18, is referred to as a "sorted" product stream. The food articles which are diverted or rejected are said to form a "diverted" product stream. In the drawing the unsorted product stream is indicated schematically by an arrow, which is in turn designated by the reference numeral 26. The sorted product stream is indicated by arrow 27. The diverted product stream is indicated by arrow 28.

Product diverter 20 comprises a bank or plurality of parallel and individually-actuable air nozzles which are positioned just downstream of upstream conveyor belt 16. In operation, food articles are launched from the downstream end of upstream conveyor belt 16. The nozzles are selectively actuated to knock "defective" food articles downward, thereby diverting defective food articles from the product stream. The remaining, undiverted articles land on downstream conveyor belt 18 to be conveyed to further stages of processing not related to this invention. Other mechanisms or means could be used in place of the air nozzles.

The physical construction of the sorter is similar to systems manufactured by Key Technology, Inc., under the trademarks Opti-Sort and ColorSort. As is conventional in sorting systems such as the Opti-Sort and ColorSort systems, sorter 10 includes one or more upstream cameras 22. For simplicity, only one such camera is shown and described. Camera 22 is positioned slightly upstream of product diverter 20 to produce an upstream video signal 24 representative of visual characteristics of unsorted food products upstream of product diverter 20, after they have been launched from upstream conveyor belt 16.

Camera 22 is preferably a digital camera incorporating one or more line-scan charge-coupled devices (CCD). Camera 22 can be configured to produce a monochrome or grey-scale video signal, or a color video signal representing product intensities in two or more color bands.

Automated sorting logic 30 is also similar to that provided in systems such as the Opti-Sort and ColorSort systems. Sorting logic 30 is connected to receive upstream video signal 24. Automated sorting logic 30 is responsive to the upstream video signal to individually determine visual characteristics of each food article and to divert a portion of the food articles from the stream depending upon their individual visual characteristics. An example of this type of sorting logic is described in U.S. Pat. No. Re. 33,357, incorporated herein by reference.

From video signal 24, sorting logic 30 derives information regarding the visual characteristics of each food article as that article passes beneath camera 22. Sorting logic 30 uses this information to individually identify food articles having undesirable visual characteristics and controls nozzles 20 to divert any such identified individual food articles from the stream of food articles. For instance, sorting logic 30 can be provide with sorting criteria specifying a certain range of colors or intensities which are to be considered undesirable. The sorting criteria can also include size thresholds—any areas having undesirable colors are rejected if the sizes of those areas exceed the size thresholds.

It is almost invariably desired to inspect and sort products at the highest possible processing rate. For instance, the infeed conveyor belts of sorters manufactured by Key Technology are typically operated at speeds approximating 500 feet per minute. Faster speeds would be used if the processing capabilities of the automated sorting logic would allow. Because of the ever-constant desire for higher processing speeds, the automated sorting logic is in most cases forced to operate at its processing limits. To increase its processing speed, it is programmed to primarily analyze defective areas of individual products and to make sorting decisions based upon simple intensity and size thresholds or look-up tables, rather than upon complicated shape analysis algorithms.

The required simplicity of sorting logic 30 can sometimes be the cause of sorting ambiguities and errors as discussed above in the section entitled "Background of the Invention." It is true that many improvements have occurred to increase the speed and accuracy of sorters such as described thus far. Nevertheless, it is generally impractical at this time to provide complex image analysis capabilities within the high-speed logic which controls product diverter 20.

To provide a high degree of control and accuracy, however, sorter 10 includes an integrated quality control monitor 36 which provides internal feedback to sorting logic 30 in the form of criteria, parameters, and setup information. This increases the accuracy and effectiveness of sorting logic 30 and generally optimizes the sorting operations performed by sorting logic 30.

The integrated quality control monitor periodically stores two-dimensional images or snapshots of the sorted product stream; thoroughly analyzes the optical characteristics of each food article in the sorted product stream; and calculates statistical information regarding the quality of the sorted product stream based upon the analysis of one or more of the stored images. The quality control monitor thus provides an automated system for determining the statistical quality of sorted food products and for determining and verifying the correct performance of sorting logic 30.

In addition, quality control monitor 36 periodically stores two-dimensional images or snapshots from camera 22 of the unsorted product stream, upstream of the product diverter. The same image analysis is performed with respect to the unsorted stream as is performed with respect to the sorted stream. Based upon both analyses, quality control monitor 36 additionally calculates inferred statistics regarding the rejected product stream.

The results of these calculations are periodically compared to statistical quality objectives to determine whether the sorter is performing optimally. Quality control monitor 36 is connected to sorting logic 30 to provide sorting criteria or sensitivity settings, and is programmed to update those criteria or settings as necessary to ensure that the optimum sort is being attained—that the sorted product stream does not contain too many defects and that the rejected product stream does not contain too many acceptable product pieces.

The analytical functions of the quality control monitor 36 are performed by a programmable quality control data processor 37 which operates in conjunction with both upstream camera 22 and with an additional, downstream camera 32. Downstream camera 32 is positioned to view the sorted stream of food articles downstream of the product diverter as the food articles are supported by downstream conveyor belt 18. Downstream camera 32 is preferably a digital camera which produces a color representation of food articles in the form of a downstream video signal 34. In the preferred embodiment, downstream camera 32 is a line-scan CCD camera. Upstream and downstream cameras 22 and 32 are preferably identical. They are calibrated to a common standard, using a correction table for every CCD element or pixel. Each correction table maps every possible color value which a pixel could produce to a corrected or calibrated color value. Accordingly, each pixel, from each of cameras 22 and 32, produces an identical digital color value in response to the same viewed subject. To accomplish this, it is also necessary to provide uniform and identical illumination (not shown) of the product stream as it passes beneath each of cameras 22 and 32. Both the illumination sources and the cameras themselves must also be stabilized to produce constant outputs over time and under varying temperatures.

Quality control monitor 36 and its data processor 37 are preferably separate from sorting logic 30 to allow the full capabilities of sorting logic 30 to be dedicated to making rejection decisions or product type characterizations and to controlling product diverter 20. A high-speed computer, such as an IBM/PC-compatible computer using an Intel 486 microprocessor is an example of the type of equipment which might constitute quality control monitor 36 or data processor 37.

Quality control monitor 36 is connected to receive both upstream video signal 24 and downstream video signal 34. Data processor 37 is responsive to downstream video signal 34, and is programmed to periodically examine a collection or sample of sorted food articles downstream from the product diverter and to calculate downstream quality statistics regarding the sorted food articles. More specifically, data processor 37 is programmed to periodically store and analyze a discrete two-dimensional representation or snapshot of a sample or discrete collection of food articles after they have been sorted. Because the preferred embodiment uses a line-scan downstream camera, a number of successive scans are accumulated to form each snapshot or two-dimensional image representation. For each image or sample, quality control data processor 37 performs detailed shape and image analysis regarding each food article shown in the image. This detailed analysis is possible because quality control monitor 36 does not need to analyze each and every food article carried by downstream conveyor belt 18. Rather, it can acquire a two-dimensional image, go "off-line," and then take as long as necessary to process and analyze that image. When it is finished processing, it acquires and analyzes another image, corresponding to another product sample.

As a first stage of quality analysis, quality control data processor 37 performs an item-by-item characterization which is somewhat similar to the characterization performed by sorting logic 30. However, even at this stage it is possible to be more precise than sorting logic 30 regarding such characterizations. Furthermore, it is possible at this stage to perform characterizations regarding article properties which are not even considered by sorting logic 30. For instance, quality control data processor 37 is programmed in some cases to provide characterizations regarding product shape, size, or length. Sorting logic 30, on the other hand, is generally limited to making its characterizations based upon the size or area of certain colors or shades within individual articles.

As a second stage of quality analysis, quality control monitor 36 calculates and compiles quality statistics regarding the overall composition of the sorted food products. These statistics include the number or statistical distribution of different product types within the sorted product stream, such as the number or statistical distribution of different types of "defective" articles within the sorted food products. Other statistical parameters might also be calculated, such as the statistical distribution of lengths or sizes of articles within the sorted food products.

In general, quality control data processor 37 is programmed to accomplish the same analyses as are performed by Key Technology's AccuScan quality control monitor, mentioned above. Quality control monitor 36 allows an operator to identify defective portions of a product sample by pointing to the defective portions on a computer display. It is possible to specify a plurality of different types of product defects or characterizations. Quality control monitor 36 furthermore accepts the processing line's statistical quality objectives and is programmed to compare the objectives to the actual, achieved results.

Quality control data processor 37 is also programmed to analyze the product stream before it has been sorted-upstream of the product diverter. Data processor 37 is responsive to upstream video signal 24 to periodically examine a collection or sample of food articles upstream from the product diverter and to calculate upstream quality statistics regarding the stream of food articles upstream of the product diverter. Specifically, data processor 37 is programmed to perform the same analytical activities with regard to the unsorted products as it does with regard to the downstream, sorted products. The same criteria are used to define and identify defective products. Identical types of quality statistics are produced regarding both the unsorted and the sorted food articles. In normal operation, quality control data processor 37 is programmed to alternate between analyzing the sorted product stream and the unsorted product stream. As discussed above, this type of analysis is only possible because data processor 37 is not under the severe time constraints required of automated sorting logic 30. Data processor 37 examines only portions of the stream of food articles, in contrast to automated sorting logic 30 which must examine, in real time, each and every food article passing through sorter 10.

In addition to the quality statistics discussed above, data processor 37 is programmed to compare the calculated upstream and downstream quality statistics to derive diverted product quality statistics representative of visual characteristics of the food articles diverted or rejected by the product diverter. As a simplified example, suppose that an average upstream sample contains 5 defective articles and 100 acceptable articles. Average downstream samples contain 1 defective article and 95 acceptable articles. It can be inferred from this information that corresponding samples of diverted products would contain, on the average, 4 defective articles and 5 acceptable articles.

Data processor 37 is programmed to compare its calculated quality statistics with the predefined target statistics or statistical objectives to determine whether sorting logic 30 is performing correctly or optimally, and to periodically program automated sorting logic 30 with updated sensitivity parameters or sorting criteria. The updated sensitivity parameters or sorting criteria are provided to sorting logic 30 through a communications path 38. The updated sorting criteria are calculated based upon the upstream quality statistics, the downstream quality statistics, and the diverted product quality statistics. In order to accomplish this, data processor 37 is programmed in accordance with a transfer function associated with sorting logic 30 and product diverter 20.

In general, if data processor 37 concludes that too many defects are passing undetected through the product diverter, it increases the sensitivity parameters used by sorting logic 30 in accordance with the appropriate transfer function. Alternatively, if quality expectations are being exceeded, data processor 37 decreases the sensitivity parameters used by sorting logic 30. Increasing the sorter's sensitivity generally means expanding the range of color values which are to be considered undesirable. Decreasing the sorter's sensitivity generally means contracting the range of color values which are to be considered undesirable. Adjustments are typically made gradually to avoid overshooting the desired objectives.

The system described above demonstrates a number of advantages over the prior art. First, it provides a closed loop system which has not been previously available in optical-based sorting systems. Furthermore, rather than relying solely on quality parameters corresponding to the sorted product, data processor 37 makes its determinations based upon a knowledge of the quality parameters corresponding to the unsorted upstream food articles, the sorted downstream food articles, and the diverted or rejected food articles. In the example mentioned above, the calculated statistics might indicate that the quality of the sorted products is within statistical objectives but that too many acceptable articles are being rejected. Corresponding changes would be required in the sorting logic's parameters to decrease the number of acceptable articles being diverted from the product stream.

This unique, closed-loop control is afforded by the combination of on-line, real-time, item-by-item sorting logic and off-line, sampled image acquisition and statistical analysis capabilities. Further advantages and efficiencies are obtained by utilizing the upstream video signal, which is available without the addition of further equipment in sorters of this type, to derive quality statistics regarding both the unsorted product stream and the diverted product stream. Using the same camera to feed both the sorting logic and the quality control monitor results in a significant cost savings.

In addition to using the calculated quality statistics for setting-up and fine-tuning sorting logic 30, these statistics are also appropriately formatted and provided to operators for documentation of product quality. To this end, quality control monitor 36 preferably includes a remote communications port 40 for bi-directional data communications with processing line controllers or in-plant local area networks. Providing information from quality control monitor 36 virtually eliminates the need for manual quality inspection.

The apparatus and system described above provides an integrated apparatus for obtaining and maintaining optimal sorting results, without the insertion in a food processing line of additional conveyors and equipment. While a competent operator might still be required at initial set-up, the integrated quality control monitor removes much of the guess-work from the process of maintaining proper settings in an automated sorter. Required changes are made automatically and immediately. No product is wasted because of waiting for manual inspection and updating of sorting criteria. The system provides an automatic and closed-loop system for ensuring that sorter 10 operates optimally to provide a sorted product stream having defects only within the specified tolerances. It also ensures that acceptable results in the finished product are not being obtained at the expense of product yield.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. An integrated bulk food sorting and analysis apparatus comprising:

a product conveyor which receives and conveys a laterally-distributed stream of bulk food articles;

a product diverter positioned relative to the product conveyor to selectively divert individual food articles from the stream upon receipt of a sorting signal;

an upstream camera positioned to produce an upstream video signal which is representative of optical characteristics of unsorted food articles upstream of the product diverter;

automated programmable sorting logic disposed in upstream video signal receiving relation relative to the upstream camera, and in signal transmitting relation relative to the product diverter, the automated programmable sorting logic generating the sorting signal in response to the upstream video signal;

a downstream camera positioned to produce a downstream video signal which is representative of optical characteristics of sorted food articles downstream of the product diverter; and a data processor coupled to the upstream video signal and which periodically examines a sample of unsorted food articles and calculates upstream quality statistics regarding the unsorted food articles and the data processor coupled in signal transmitting relation relative to the automated programmable sorting logic and further responsive to the downstream video signal to periodically examine a sample of sorted food articles and to calculate downstream quality statistics regarding the sorted food articles.

2. An integrated bulk food sorting and analysis apparatus as recited in claim 1, wherein the data processor compares the calculated upstream and downstream quality statistics to derive diverted product quality statistics regarding the food articles diverted by the product diverter.

3. An integrated bulk food sorting and analysis apparatus as recited in claim 1, wherein the automated programmable sorting logic identifies individual food articles to be diverted from the stream by means of a sorting criteria, and wherein the automated programmable sorting logic generates the sorting signal in response to the sorting criteria, the product diverter being responsive to the sorting signal to divert the identified individual food articles from the stream.

4. An integrated bulk food sorting and analysis apparatus as recited in claim 1, wherein the data processor periodically programs the automated programmable sorting logic with sorting criteria, the data processor being programmed to calculate the sorting criteria based at least in part upon the downstream quality statistics, and wherein the automated programmable sorting logic generates the sorting signal by means of the sorting criteria.

5. An integrated bulk food sorting and analysis apparatus as recited in claim 1, wherein the data processor periodically programs the automated sorting logic with sorting criteria, the data processor being programmed to calculate the sorting criteria based at least in part upon the upstream quality statistics, and wherein the automated programmable sorting logic generates the sorting signal by means of the sorting criteria.

6. An integrated bulk food sorting and analysis apparatus as recited in claim 1, wherein the data processor periodically programs the automated sorting logic with sorting criteria, the data processor being programmed to calculate the sorting criteria based at least in part upon both the upstream and the downstream quality statistics, and wherein the automated programmable sorting logic generates the sorting signal by means of the sorting criteria.

7. An integrated bulk food sorting and analysis apparatus as recited in claim 1, wherein the product conveyor comprises an upstream conveyor belt portion and a downstream conveyor belt portion, the product diverter being positioned to divert food articles from the stream before they reach the downstream conveyor belt portion.

8. An integrated bulk food sorting and analysis apparatus as recited in claim 1, wherein the product diverter comprises a plurality of individually-actuable air nozzles responsive to the sorting signal transmitted by the automated programmable sorting logic.

9. An integrated bulk food sorting and analysis apparatus as recited in claim 1, wherein the data processor is programmed to examine only portions of the stream of food articles to calculate the upstream and downstream quality statistics.

10. An integrated bulk food sorting and analysis apparatus as recited in claim 1, wherein the upstream camera is a line scan camera.

11. An integrated bulk food sorting and analysis apparatus comprising:

a product conveyor which receives and conveys a laterally-distributed stream of bulk food articles;

a product diverter positioned laterally across the product conveyor to selectively divert individual food articles from the stream;

an upstream camera positioned to produce an upstream video signal which is representative of optical characteristics of unsorted food articles upstream of the product diverter;

automated sorting logic responsive to the upstream video signal to individually determine optical characteristics of the unsorted food articles, the product diverter being responsive to the automated sorting logic to divert individual food articles from the stream depending upon their individual optical characteristics;

a downstream camera positioned to produce a downstream video signal which is representative of optical characteristics of the sorted food articles downstream of the product diverter; and a data processor which is responsive to the upstream and downstream video signals to periodically examine a sample of unsorted and sorted food articles and to calculate upstream and downstream quality statistics regarding the unsorted and sorted food articles, the data processor being further coupled in signal transmitting relation relative to the automated sorting logic.

12. An integrated bulk food sorting and analysis apparatus as recited in claim 11, wherein the data processor periodically programs the automated sorting logic with sorting criteria, the data processor being programmed to calculate the sorting criteria based at least in part upon the downstream quality statistics.

13. An integrated bulk food sorting and analysis apparatus as recited in claim 11, wherein the data processor periodically programs the automated sorting logic with sorting criteria, the data processor being programmed to calculate the sorting criteria based at least in part upon both the upstream and the downstream quality statistics.

14. An integrated bulk food sorting and analysis apparatus as recited in claim 11, wherein the data processor periodically programs the automated sorting logic with sorting criteria, and wherein the data processor compares the calculated upstream and downstream quality statistics to derive diverted product quality statistics regarding the food articles diverted by the product diverter and calculates the sorting criteria based at least in part upon the downstream quality statistics and the diverted product quality statistics, the sorting criteria being provided to the automated programmable sorting logic.

15. An integrated bulk food sorting and analysis apparatus as recited in claim 11, wherein the product conveyor comprises an upstream conveyor belt and a downstream conveyor belt, and wherein the product diverter is positioned to divert food articles from the stream before they reach the downstream conveyor belt.

16. An integrated bulk food sorting and analysis apparatus as recited in claim 11, wherein the product diverter comprises a plurality of individually-actuable air nozzles responsive to the automated programmable sorting logic.

17. An integrated bulk food sorting and analysis apparatus as recited in claim 11, wherein the data processor is programmed to examine only portions of the stream of food articles to calculate the upstream and downstream quality statistics.

18. An integrated bulk food sorting and analysis apparatus as recited in claim 11, wherein the upstream camera is a line scan camera.

19. An integrated bulk food sorting and analysis apparatus comprising:

a product conveyor which receives and conveys a laterally-distributed stream of bulk food articles;

a product diverter positioned laterally across the product conveyor to selectively divert individual food articles from the stream;

an upstream camera positioned to produce an upstream video signal which is representative of optical characteristics of unsorted food articles upstream of the product diverter;

automated programmable sorting logic responsive to the upstream video signal to individually determine optical characteristics of each unsorted food article, the product diverter being responsive to the automated programmable sorting logic to divert individual food articles from the stream depending upon their individual optical characteristics;

a downstream camera positioned to produce a downstream video signal which is representative of optical characteristics of sorted food articles downstream of the product diverter;

a data processor disposed in programming relation relative to the automated programmable sorting logic and which is responsive to the upstream video signal to periodically examine a sample of unsorted food articles and to calculate upstream quality statistics regarding the unsorted food articles.

and further is responsive to the downstream video signal to periodically examine a sample of sorted food articles downstream and to calculate downstream quality statistics regarding the sorted food articles, the data processor being programmed to compare the calculated upstream and downstream quality statistics to derive diverted product quality statistics regarding the food articles diverted by the product diverter.

20. An integrated bulk food sorting and analysis apparatus as recited in claim 19, wherein the data processor periodically programs the automated programmable sorting logic with sorting criteria, the data processor being programmed to calculate the sorting criteria based at least in part upon the diverted product quality statistics.

21. An integrated bulk food sorting and analysis apparatus as recited in claim 19, wherein the data processor periodically programs the automated programmable sorting logic with sorting criteria, the data processor being programmed to calculate the sorting criteria based at least in part upon both the upstream and the downstream quality statistics.

22. An integrated bulk food sorting and analysis apparatus as recited in claim 19, wherein the data processor periodically programs the automated programmable sorting logic with sorting criteria, the data processor being programmed to calculate the sorting criteria based at least in part upon the downstream quality statistics and the diverted product quality statistics.

23. An integrated bulk food sorting and analysis apparatus as recited in claim 19, wherein the product conveyor comprises an upstream conveyor belt portion and a downstream conveyor belt portion, the product diverter being positioned to divert food articles from the stream before they reach the downstream conveyor belt portion.

24. An integrated bulk food sorting and analysis apparatus as recited in claim 19, wherein the product diverter comprises a plurality of individually-actuable air nozzles responsive to the automated programmable sorting logic.

25. An integrated bulk food sorting and analysis apparatus as recited in claim 19, wherein the data processor is programmed to examine only portions of the stream of food articles to calculate the upstream and downstream quality statistics.

26. An integrated bulk food sorting and analysis apparatus as recited in claim 19, wherein the upstream camera is a line scan camera.

27. An integrated bulk food sorting and analysis apparatus comprising:

a product conveyer which receives and conveys a laterally-distributed stream of bulk food articles;

automated sorting logic having programmable sorting criteria which identifies individual food articles to be diverted from the stream and which generates a sorting signal in response to the sorting criteria;

a product diverter positioned relative to the product conveyor and in sorting signal receiving relation relative to the automated sorting logic to selectively divert individual food articles from the stream in response to the sorting signal provided by the automated sorting logic;

an upstream camera positioned to produce an upstream video signal which is representative of optical characteristics of unsorted food articles upstream of the product diverter and which is connected in video signal transmitting relation relative to the automated sorting logic, the sorting criteria generating the sorting signal in response to the upstream video signal;

a downstream camera positioned to produce a downstream video signal which is representative of optical characteristics of sorted food articles downstream of the product diverter; and a data processor connected in video signal receiving relation relative to the upstream and downstream cameras and coupled in programming relation relative to the automated sorting logic, the data processor responsive to the upstream video signal to periodically examine a sample of unsorted food articles and to calculate upstream quality statistics regarding the unsorted food articles, and which is further responsive to the downstream video signal to periodically examine a sample of sorted food articles to calculate downstream quality statistics regarding the sorted food articles, the data processor periodically programming the automated sorting logic with updated sorting criteria based in part upon the downstream quality statistics.

* * * * *

UNITED STATES PATENT AND TRADEMARK OFFICE

CERTIFICATE OF CORRECTION

PATENT NO. : 5,526,437
DATED : June 11, 1996
INVENTOR(S) : James K. West

It is certified that error appears in the above-indentified patent and that said Letters Patent is hereby corrected as shown below:

Colume 12, line 22, after the word "articles", delete the -- . -- and insert -- , --

Signed and Sealed this

Thirty-first Day of December, 1996

Attest:

BRUCE LEHMAN

*Attesting Officer* *Commissioner of Patents and Trademarks*